United States Patent Office 2,967,864
Patented Jan. 10, 1961

2,967,864

QUATERNIZED MORPHINE DERIVATIVES

Bernard Rudner, Pittsburgh, Pa., assignor to W. R. Grace & Co., New York, N.Y., a corporation of Connecticut No Drawing. Filed Aug. 18, 1958, Ser. No. 755,394

10 Claims. (Cl. 260—256.4)

This invention relates to quaternzied alkaloids of the opium poppy. In one specific aspect, it relates to quaternary salts of morphine and its derivatives which are also hydrazinium compounds.

The dried latex of the opium poppy (Papaver somniferum) contains at least 24 different alkaloids. The so called phenanthrene group includes the important drugs morphine, codeine and neopine. Morphine exerts a depressing action on the central nervous system and has tremedous analgesic properties. The poppy alkaloids were known before recorded history and yet they remain some of the most valuable drugs at the disposal of the physician. I have discovered a new generic class of quaternary salts of morphine and its derivatives having remarkable pharmaceutical properties.

It is therefore an object of the present invention to provide a new class of hydrazinium salts, useful for pharmaceutical purposes, which can be made in commercial quantities.

In accordance with the present invention, there has been discovered a new and useful generic class of hydrazinium compounds corresponding to the general formula:

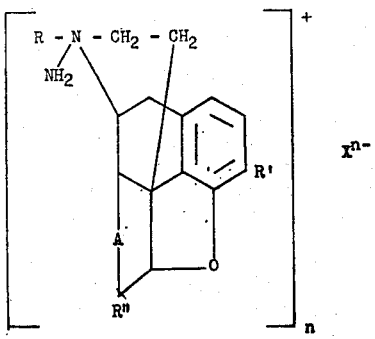

In the above formula, —A— represents a two carbon link forming a six-membered ring. The ring may be saturated or unsaturated with —A— having the values —C—C—, —C=C—, =C—C= and =C—C—. To put it another way, A is the two carbon chain which completes (with the two carbocyclic rings) the hydrophenanthrene ring system. R is a lower alkyl or alkenyl radical. R' may be hydrogen, hydroxyl lower alkoxy or lower alkanoyloxy. R" represents hydrogen, hydroxyl lower alkoxy, lower alkanoyloxy or oxo. X is an anion having the charge $n$; $n$ also represents the number of cations required to balance the anionic charge. It is understood that the four valences of carbon not otherwise accounted for are saturated by hydrogen. This simplified procedure for writing complex structural formulas is familiar to the organic chemist.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycolate, phosphate, phenylethylbarbiturate, o-acetoxybenzoate, citrate, dialkylbarbiturate, sulfathiazole, theophyllinate, urate, malete, fumarate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene, and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

It has been only within the last few years that the structure of morphine has been known with a reasonable degree of certainty. Amines suitable as starting materials for the practice of my invention are structurally closely related to morphine. Many occur naturally in the oriental poppy together with morphine while the others are well known synthetic derivatives of morphine. Many of the variations are concerned with the location of the unsaturation in the partially saturated ring or with the status of the two hydroxyl groups present in morphine. Simple ether or ester derivatives of the hydroxyl groups account for most of the synthetic morphine derivatives. A partial list of amines suitable for the practice of my invention includes morphine, allylmorphine, desomorphine, ethylmorphine, allylnormorphine, dihydromorphine, dihydromorphinone, methyldihydromorphinone, diacetylmorphine, codeine, beta-codeine, dihydrocodeine, dihydrocodeinone enol acetate, dihydroxycodeinone, thebaine, dihydrothebaine, 3-methoxy-N-methylmorphinane and 3-hydroxy-N-methylmorphinane.

The novel hydrazinium compounds of my invention are useful as pharmaceuticals. Because they are so closely related chemically, it is not surprising that they possess similar pharmaceutical properties. Typical compounds of my invention have been found to possess analgesic properties. The scope and utility of my invention is further illustrated by the following examples:

*Example I*

Using the chloramine generator of Sisler et al. discussed above, 24 g. of chlorine was converted to gaseous chloramine and passed into a solution of 25 g. of codeine in 500 ml. of chloroform. After standing overnight, the reaction mixture was filtered to obtain 23 g. of 90% pure product. Repeated recrystallization from methyl alcohol-ethyl acetate gave an off-white solid melting 263° C. 1-amino-codeininium chloride was soluble in water and alcohol and insoluble in benzene and cold ethyl acetate; its structural formula is given below. Aqueous solutions of the product treated with saturated solutions of potassium hexafluorophosphate and picric acid gave N-aminocodeinium hexafluorophosphate (M.P. 210° C.) and picrate (M.P. ca. 122° C.) respectively.

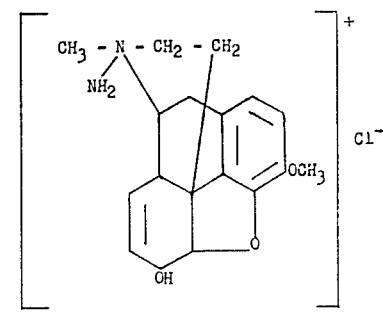

*Examples II–VI*

A solution of 0.35 g. of the chloride of Example I in 10 ml. of water was treated with 5 drops of dilute nitric acid followed by 10 ml. of 0.1 N silver nitrate. After being warmed for 10 minutes with stirring, the cooled reaction mixture was filtered and the filtrate evaporated almost to dryness. The residue was carefully neutralized with dilute sodium hydroxide and taken up in isopropyl alcohol. The resultant suspension was filtered and the filtrate added to a five volume excess of dioxane yielding N-aminocodeinium nitrate as a yellow oil decomposing ca. 92° C.

A solution of 0.35 g. of the chloride of Example I was treated as above with 100 ml. of a saturated aqueous solution of silver benzoate. After filtration from the resultant silver chloride, the filtrate was evaporated to yield hydrated N-aminocodeinium benzoate which lost solvent around 100° C. and melted with decomposition ca. 187° C.

A solution of the chloride of Example I was treated with excess 20% potassium iodide solution. N-aminocodeinium iodide (M.P. 226° C. dec.) slowly precipitated from solution as yellow plates.

About 100 mg. of the chloride of Example I was held at 65° C. for about two hours with 60 mg. of 70% phosphoric acid. After evaporating the reaction mixture in vacuo at that temperature to a thick yellow oil, 10 ml. of anhydrous dioxane was added to the residue. The semisolid phosphate resulting on trituration was separated by filtration, boiled with chloroform to drive off volatile chlorides and refiltered. Yellow N-aminocodeinium phosphate was extremely hygroscopic losing some water at 100–125° C. and decomposing with the evolution of gas ca. 265° C.

Equal weights of potassium guaiacol sulfonate and N-aminocodeinium chloride were boiled together for 25 minutes in isopropyl alcohol. After cooling overnight in the refrigerator, the filtrate was separated from potassium chloride and unreacted sulfonate and poured into 100 ml. of chloroform. The resultant heavy oil was triturated successively with chloroform, dioxane, a small amount of deionized water and finally dioxane. Vacuum drying gave the chloride free guaiacol sulfonate as a yellow semi-solid decomposing about 143° C.

Example VII

Twenty-five grams of dihydrocodeinone bitartrate dissolved in 300 ml. of water was brought to a pH of 9 with concentrated sodium hydroxide and the free base immediately extracted with chloroform. The chloroform extract was washed with water, dried and made up to 500 ml. before being treated with gaseous chloramine made from 12 g. of chlorine. The general procedure and work up was similar to that of Example I. The 20 g. of product on purification yielded white crystals melting above 285° C. and formed the picrate (M.P. 217–220° C. dec.) and the hexafluorophosphate (dec. 280° C.). Treatment of 1-aminodihydrocodeinonium chloride (structure given below) with 2,4-dinitrophenylhydrazine in dilute hydrochloric acid gave the 2,4-dinitrophenylhydrazone as orange crystals decomposing about 260° C.

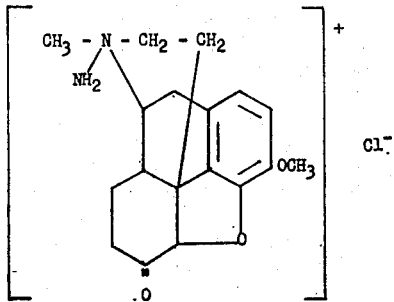

Example VIII

Equal parts of the chloride of Example VI and the tartar emetic were refluxed together for 30 minutes in isopropyl alcohol and the reaction mixture filtered hot from the resultant insoluble potassium chloride. On cooling, needles of N-aminodihydrocodeinonium antimony tartrate separated. The product decomposing about 178° C. contained no chloride ion.

Example IX

Twenty-five grams of ethylmorphine hydrochloride was mixed with water, chloroform and sodium carbonate. The chloroform layer containing the liberated base was separated and dried before being treated with excess chloramine. Filtration of the reaction mixture and evaporation of the filtrate gave 12.2 g. of crude product. The 14.3 g. of solid remaining in the filter was extracted with hot chloroform yielding 8 g. additional product on evaporation of the solvent. The product gave an oily picrate and a brown hexafluorophosphate melting 155–157° C. The crude chloride was dissolved in ethyl alcohol, treated with activated charcoal and filtered into excess ethyl acetate. Filtration gave a light tan product decomposing 260° C.; its structure is shown below. Calculated for $C_{19}H_{26}N_2O_3Cl$: percent C, 62.3; percent H, 7.18; percent N, 7.66; and percent Cl, 9.68. Found: percent C, 61.8; percent H, 6.71; percent N, 7.31; and percent Cl, 9.55.

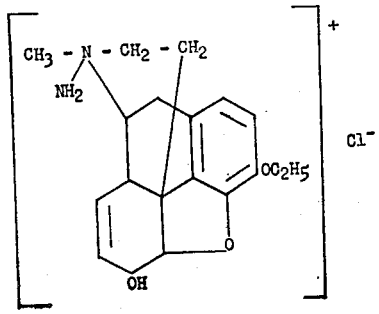

Example X

Equal parts of the chloride of Example VIII and sodium barbital were refluxed in isopropyl alcohol. After filtration from sodium chloride, the filtrate was evaporated to dryness. The residue was crystallized by dissolving in isopropyl alcohol and adding the solution to chloroform. N-aminoethylmorphinium, 5,5-diethylbarbiturate was an off-white solid melting 157–158° C.

Example XI

A solution of twenty-five grams of morphine in chloroform was first saturated with ammonia then treated with the chloramine made from 25 g. of chlorine. After standing overnight, the reaction mixture was filtered to obtain 22 g. of N-aminomorphinium chloride (14.2% $Cl^-$ or 95% pure) melting and decomposing about 195° C. The product was insoluble in chloroform but soluble in water or alcohol. It had a reddish tinge due to the presence of an uncharacterized oxidation product. N-aminomorphinium chloride has the following structure:

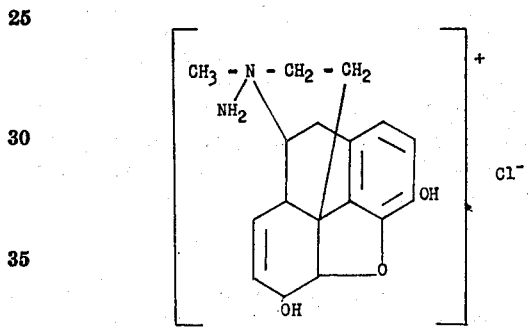

Example XII

A solution of fifty grams of thebaine in chloroform was first saturated with ammonia and then treated with gaseous chloramine as in the previous example. Filtration gave 36 g. of N-aminothebainium chloride; evaporation of the filtrate yielded 7 g. additional of crude product. Recrystallization of the combined solids from acetonitrile-carbon tetrachloride gave an off-white hygroscopic solid (M.P. 194–195° C.) only 87.3% pure by chloride titration. Further purification was effected by dissolving the product in water, making the solution alkaline with sodium carbonate and evaporating to dryness. Recrystallization of the soluble residue from acetonitrile-carbon tetrachloride gave a product melting 204–205° C. It formed a picrate melting at 205° C. which analyzed 54.9% C, 4.86% H and 12.4% N as compared with theoretical values of 54.1% C, 4.54% H and 12.61% N. It also formed a hexafluorophosphate melting at 225° C., the structure of which is shown below:

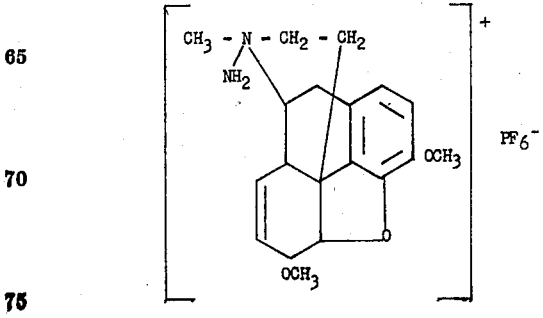

Example XIII

Several representative compounds of my invention were tested to show their utility as analgesics using male albino rats as the test animals. Heat generated by an automobile spotlight, operating with suitable focusing lens, served as a pain stimulus. The heat was focused on the rats' tails and the time required for the animal to respond by a flick of the tail was measured and represents the reaction time. For purposes of injection, all test compounds were prepared in distilled water and the concentration of each solution was adjusted so that all animals received 1.0 ml. of solution per 100 g. of body weight. Reaction times were recorded for each animal one hour prior to intraperitoneal injections of various doses (10 to 50.6 mg./kg.) of the test compounds. A thirty minute absorption period was allowed before redetermining the reaction time. Five animals were used per dose of each compound and the averaged results are tabulated below:

| Test Compound | Dose, mg./kg. | Mean reaction time in seconds | |
| --- | --- | --- | --- |
| | | Control | Test |
| N-aminodihydrocodeinonium chloride | 22.5 | 9.0 | 11.5 |
| | 50.6 | 10.5 | 15.0 |
| N-aminoethylmorphinium chloride | 10.0 | 12.5 | 12.6 |
| | 22.5 | 8.5 | 10.5 |
| N-aminomorphinium chloride | 10.0 | 9.5 | 11.3 |
| | 22.5 | 10.4 | 13.2 |

The acute intraperitoneal lethal doses ($LD_{50}$) in white mice of N-amino-dihydrocodeinonium chloride, N-aminoethylmorphinium chloride and N-aminomorphinium chloride were 35, 300 and 300 mg./kg. respectively.

I claim:
1. Compounds of the formula:

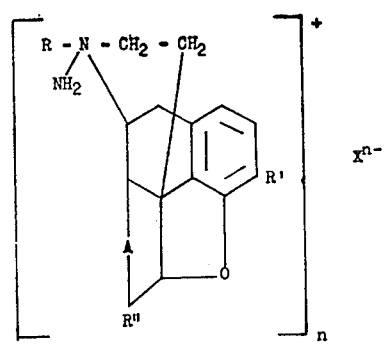

wherein —A— represents an unsubstituted two carbon linkage selected from the group consisting of —C—C—, —C=C—, =C—C= and =C—C; R is selected from the group consisting of lower alkyl and lower alkenyl radicals; R' is selected from the group consisting of hydrogen, hydroxyl, lower alkoxy and lower alkanoyloxy; R" is selected from the group consisting of hydrogen, hydroxyl, lower alkoxy, lower alkanoyloxy and oxo; X is a pharmaceutically acceptable anion; and $n$ is an integer less than four.

2. Compounds according to claim 1 wherein R is lower alkyl, R' and R" are hydroxyl and X is chloride.
3. Compounds according to claim 1 wherein R is lower alkyl, R' is lower alkoxy, R" is hydroxyl and X is chloride.
4. Compounds according to claim 1 wherein R is lower alkyl, R' and R" are lower alkoxy and X is chloride.
5. Compounds according to claim 1 wherein R is lower alkyl, R' is lower alkoxy, R" is oxo and X is chloride.
6. N-aminomorphinium chloride.
7. N-aminocodeinium benzoate.
8. N-aminoethylmorphinium 5,5-diethylbarbiturate.
9. N-aminothebainium chloride.
10. N-aminodihydrocodeinonium chloride.

No references cited.